United States Patent
Lahmann et al.

(10) Patent No.: US 7,460,937 B2
(45) Date of Patent: Dec. 2, 2008

(54) METHOD FOR GENERATING A FIRING DECISION FOR A RESTRAINING SYSTEM

(75) Inventors: Robert Lahmann, Nürnberg (DE); Michael Schmid, Kornwestheim (DE); Mario Kroeninger, Buehl (DE)

(73) Assignee: Robert Bosch GmbH, Stuttgart (DE)

( * ) Notice: Subject to any disclaimer, the term of this patent is extended or adjusted under 35 U.S.C. 154(b) by 295 days.

(21) Appl. No.: 10/543,010

(22) PCT Filed: Oct. 6, 2003

(86) PCT No.: PCT/DE03/03303

§ 371 (c)(1),
(2), (4) Date: Apr. 13, 2006

(87) PCT Pub. No.: WO2004/069603

PCT Pub. Date: Aug. 19, 2004

(65) Prior Publication Data

US 2006/0229783 A1 Oct. 12, 2006

(30) Foreign Application Priority Data

Jan. 28, 2003 (DE) ................. 103 03 149

(51) Int. Cl.
*B60R 21/013* (2006.01)
*G06F 7/00* (2006.01)
*B60K 28/14* (2006.01)

(52) U.S. Cl. ............... 701/45; 180/282; 280/734
(58) Field of Classification Search ............... 701/45, 701/46, 47; 180/271; 280/734, 735
See application file for complete search history.

(56) References Cited

U.S. PATENT DOCUMENTS

| | | | |
|---|---|---|---|
| 6,192,305 B1 | 2/2001 | Schiffmann | |
| 6,438,463 B1 | 8/2002 | Tobaru et al. | |
| 2002/0087235 A1* | 7/2002 | Aga et al. | 701/1 |
| 2004/0254707 A1* | 12/2004 | Lu et al. | 701/70 |

FOREIGN PATENT DOCUMENTS

| | | |
|---|---|---|
| DE | 101 49 112 | 4/2003 |
| EP | 1 219 500 | 7/2002 |
| EP | 1 258 399 | 11/2002 |
| GB | 2 367 043 | 3/2002 |
| WO | WO 99/47384 | 9/1999 |

* cited by examiner

*Primary Examiner*—Jack W Keith
*Assistant Examiner*—Edward Pipala
(74) *Attorney, Agent, or Firm*—Kenyon & Kenyon LLP

(57) ABSTRACT

A method is provided for generating a triggering decision for a restraint system, in which method the triggering decision is generated as a function of a conjunction of the vehicle lateral acceleration and a rate of rotation. The vehicle lateral acceleration is additionally subjected to a threshold value decision, the respective threshold value being set as a function of at least one component of the velocity of the vehicle's center of gravity.

20 Claims, 4 Drawing Sheets

Fig. 3
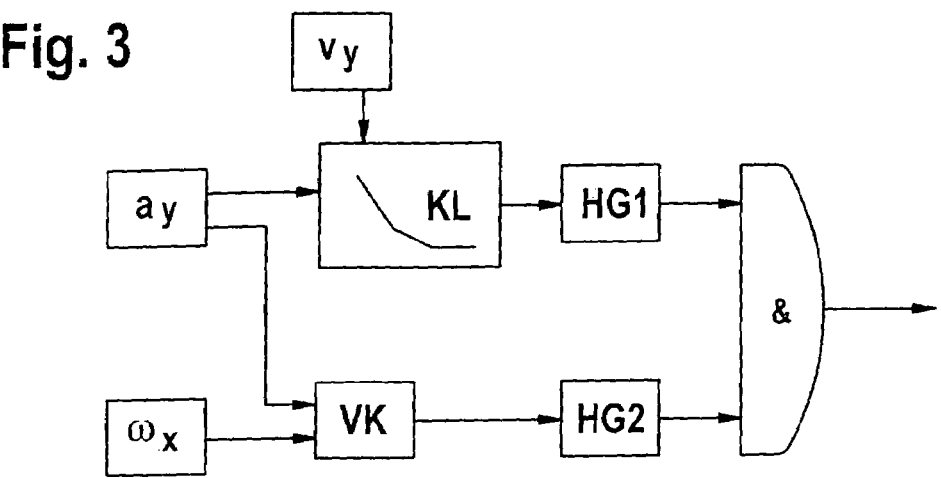
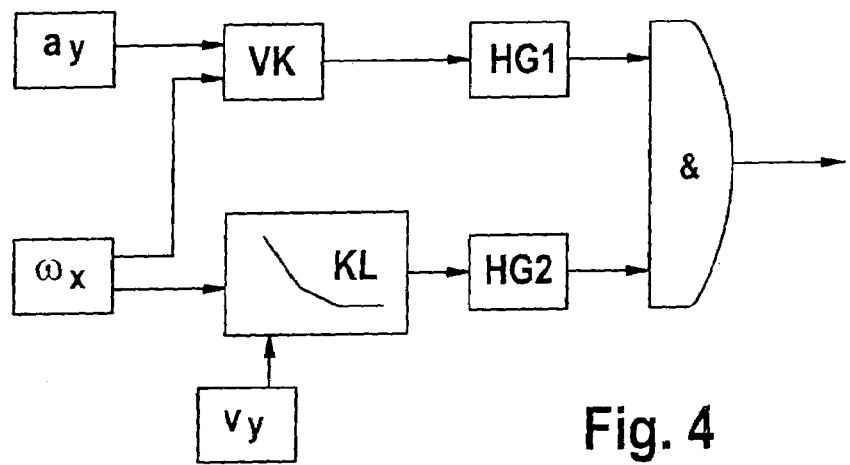
Fig. 4
Fig. 5
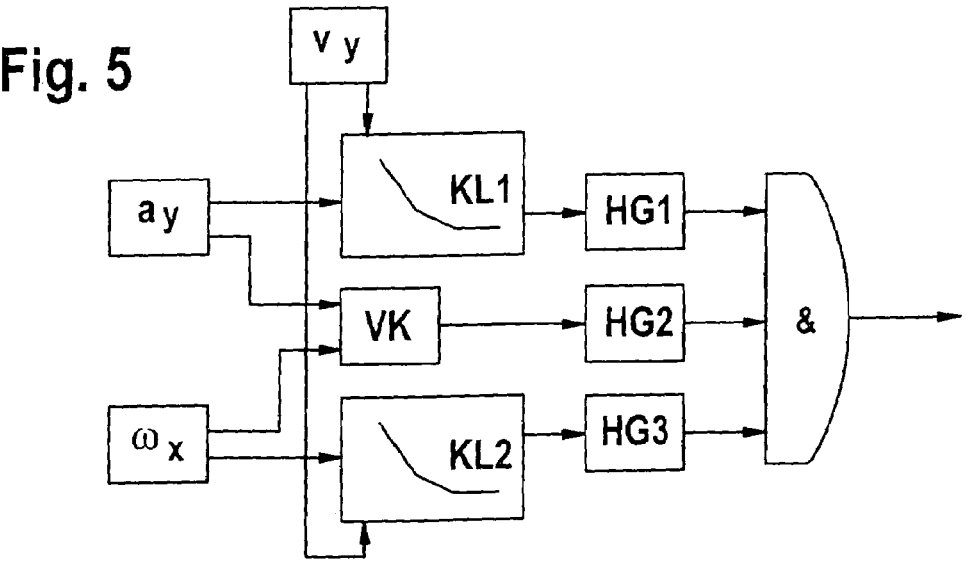

$v_y$ = 60 km/h, determined exactly $v_y$ = 60 km/h, determined with a precision of ± 10 km/h

METHOD FOR GENERATING A FIRING DECISION FOR A RESTRAINING SYSTEM

FIELD OF THE INVENTION

The present invention relates to a method for generating a triggering decision for a restraint system.

BACKGROUND INFORMATION

A method for generating a triggering decision for a restraint system, e.g., for soil trips, are described in the applicant's German patent application DE 101 49 112. Soil trips are situations in which the vehicle, following a skidding event, slips sideways and then ends up on ground that has a high coefficient of friction, for example the unpaved ground alongside a roadway. If the vehicle then slips to the right, for example, as represented in FIG. 1, namely vehicle 1a on roadway 2, the tires on the right side will experience a strong deceleration at point 1b, which will then induce a torque of the vehicle on the unpaved ground 3. At time 1c, the vehicle is already fully engaged in a rollover event. In German patent application DE 10149 112, the triggering decision is determined as a function of vehicle dynamics data, a sideslip angle in conjunction with a vehicle lateral velocity and a vehicle tilting motion being used as vehicle dynamics data. The triggering decision is then generated by suitable threshold value comparisons.

Published international patent application WO 99/47384 describes the generation of the triggering decision in the case of a soil trip rollover as a function of the rate of rotation about the longitudinal axis of the vehicle, a vehicle velocity and a vehicle lateral acceleration. In the process, the vehicle lateral acceleration is compared to a fixed threshold value. Only when this fixed threshold value is exceeded can a triggering decision be reached.

SUMMARY

By contrast, the method according to the present invention for generating a triggering decision for a restraint system has the advantage that it allows for an earlier triggering in the case of soil trips. This is due to the fact that not only the vehicle lateral acceleration is conjoined with the rate of rotation, but that the vehicle lateral acceleration is additionally compared to a threshold value, which is set as a function of at least one component of the velocity of the vehicle's center of gravity. The adjustment of the threshold value results in an improved adaptation to the accident behavior. The adaptation can occur continuously or in longer time intervals. This threshold value decision is to be understood in such a way that a pair of values made up of the vehicle lateral acceleration and the vehicle lateral velocity is compared to a characteristic curve. Other components of the velocity of the vehicle's center of gravity may be used as well, however, to obtain an estimate of the lateral velocity of the vehicle. Even the vehicle longitudinal velocity may be used here, since, for example, in a skidding event the velocity of the center of gravity remains approximately constant in the first phase of skidding, but is transformed from a longitudinal velocity into a lateral velocity. Thus signals are used, which are ascertained by a kinematic sensory system. The present invention is described below in light of the vehicle lateral velocity.

Analyses of soil trip vehicle tests have shown that the vehicle's lateral velocity has a decisive influence on the maximum roll angles reached and thus on the rollover behavior of a vehicle. For generating a triggering decision, it is advantageous to ascertain the signals of a rate-of-rotation sensor for rotations about the longitudinal axis of the vehicle and to conjoin them with those of an acceleration sensor in the lateral direction of the vehicle. This results in increased safety with the possibility of earlier triggering. The vehicle lateral acceleration is suitable, since, as shown above, in the case of a soil trip, there is a lateral deceleration that initiates the rollover event.

It is furthermore possible to use the vehicle lateral velocity as well as the vehicle lateral acceleration and the rate of rotation around the longitudinal axis of the vehicle so as to provide for a high degree of safety for the triggering decision and at the same time for a very early triggering decision.

It is especially advantageous that the conjunction of the vehicle lateral velocity and the vehicle lateral acceleration and possibly the rate of rotation around the longitudinal axis of the vehicle is implemented in such a way that the vehicle lateral acceleration and the rate of rotation are compared to pairs of values for generating the triggering decision. These pairs of values are generated as a function of the vehicle lateral velocity as a parameter. It can be advantageously provided that the pairs of values as a function of the vehicle lateral velocity are already stored, for example as a characteristic curve, in the vehicle in a suitable memory unit and are then loaded for comparison. If, using the vehicle dynamics data, a vehicle lateral velocity is determined, which lies outside of the range covered by the characteristic curve in the memory, this can be compensated by a suitable extrapolation of the existing characteristic curves.

The characteristic curve may be provided as continuous or it may also be provided as a set of pairs of values between which, if necessary, an interpolation is made. It is advantageously provided to compare the vehicle lateral velocity to a specified threshold, which is a function of the chosen vehicle type and which must be exceeded for a rollover event to occur in the first place. If the vehicle lateral velocity lies below this threshold, the triggering decision is always negative, i.e., triggering does not occur.

The set of pairs of values is advantageously influenced as a function of the precision of the estimate for the vehicle lateral velocity. That is to say, if the velocity estimate has an imprecision of 10 km/h, then it is necessary for a safe estimation and further processing for generating the triggering decision to adopt the lower limit of a confidence interval around the velocity estimate in order to prevent a false triggering or a premature triggering. In the case of a relative, i.e., non-absolute, precision of the velocity estimate of, e.g., 10%, a further possibility is to scale the value for the vehicle lateral velocity.

For generating the triggering decision, the rate of rotation can be subjected to a threshold value comparison, the threshold value being fixed or set as a function of the at least one component of the velocity of the vehicle's center of gravity.

BRIEF DESCRIPTION OF THE DRAWINGS

FIG. 3 shows a block diagram of an implementation of a first method according to the present invention.

FIG. 4 shows a block diagram of an implementation of a second method according to the present invention.

FIG. 5 shows a block diagram of an implementation of a third method according to the present invention.

DETAILED DESCRIPTION

Modern systems for sensing rollover events work with micromechanical rate-of-rotation sensors, which also allow for the calculation of the angle of rotation via a numerical integration. The combination of rate-of-rotation and rotation-angle information allows for the prediction of the rollover and thus for a triggering decision, which is more robust and more flexible than triggering via a fixed angle threshold of a tilt sensor. Rollover sensing systems based on rate-of-rotation sensors thus also allow for the triggering of irreversible restraint devices, such as pyrotechnical belt tensioners and window bags, in addition to the original applications of rollover sensing systems, e.g., the triggering of a reversible roll bar in a cabriolet. A classical rollover event is induced by the fact that, due to the condition of the surroundings, a movement in the z direction, i.e., in the vertical direction, is imposed on the vehicle, which causes the vehicle to rotate. Typical examples for such situations are steep slopes alongside the roadway as well as ramps, which in practice are lateral guard rails. In such maneuvers, the lateral accelerations are relatively low and the occupants enter a so-called "out-of-position" situation only at a late stage, if at all, so that the triggering of the passenger protection systems are necessary only at a relatively late point in time. In this context, an "out-of-position" situation means that an occupant is not in the appropriate sitting position for receiving optimum protection by restraint devices.

Figure 1:
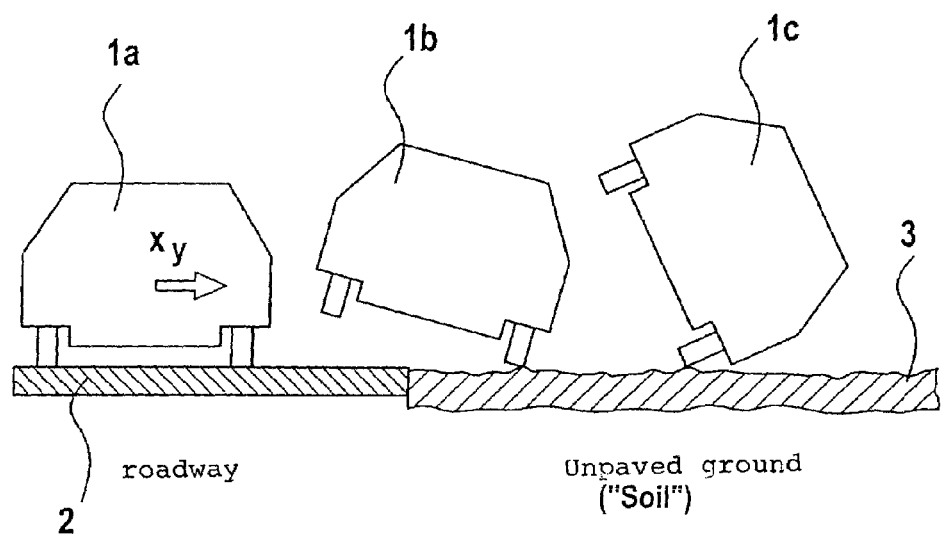
FIG. 1 illustrates a so-called soil trip.

Things look different in the case of so-called soil trip rollovers. These are situations in which, following a skidding event, the vehicle slips sideways and then ends up on ground that has a high coefficient of friction, for example an unpaved ground alongside a roadway as shown in FIG. 1. If the vehicle slips to the right, as shown in the figure, then the tires on the right side will experience a strong deceleration, which then causes a rotational momentum in the vehicle. The decisive difference compared to the rollover events previously described is the fact that the occupants will end up "out of position" very early on due to the high lateral deceleration. Thus it is necessary to protect the occupants very early on against injuries from striking the center pillar or the window pane by activating the appropriate protective devices, for example window bags. Such an early triggering is not possible using conventional systems without the danger of unintentionally firing the restraint means in many not requiring triggering cases. The present invention presents a method that makes an early triggering time possible in the event of soil trips.

To make such an early triggering possible in the case of soil trips, the present invention uses, in addition to the variables of rate of rotation and acceleration in the y and z directions, a suitably ascertained vehicle velocity in the y direction, i.e., the vehicle lateral velocity. Other components of the velocity of the vehicle's center of gravity may also be used, however, which can be used as approximate values for the vehicle lateral velocity.

Analyses of soil trip vehicle tests have shown that the vehicle lateral velocity has a decisive influence on the maximum roll angle reached and thus on the rollover behavior of a vehicle in soil trip events. In this context, the vehicle lateral velocity is ascertained using data from a vehicle dynamics system such as ESP, for example. There are also other possibilities, however, for ascertaining the vehicle lateral velocity.

According to the present invention, the triggering decision is generated in such a way that, in addition to conjoining the rate of rotation and the vehicle lateral acceleration, the vehicle lateral acceleration is subjected to a threshold value decision, the threshold value being set as a function of at least one component of the velocity of the vehicle's center of gravity. The vehicle lateral velocity may be used for this purpose.

The suitably filtered acceleration in vehicle lateral direction $a_y$ is especially suitable for the threshold value decision since a lateral acceleration beginning on the tire initiates the rollover event. As vehicle tests have confirmed, with decreasing vehicle lateral velocity $v_y$, the lateral acceleration $a_y$ must increase to cause a vehicle to roll over. The connection in this respect is normally not linear and is taken into consideration by the threshold decision. Rather, as a function of the vehicle lateral velocity, the larger the gradient of the critical lateral acceleration, i.e., the lateral acceleration that results in a rollover, the more the vehicle lateral velocity approximates the so-called "critical sliding velocity (CSV)" of higher velocities.

The CSV is defined as the lateral velocity of the vehicle, below which a rollover of the vehicle is impossible due to fundamental physical principles, that is, the energy balance. The precise shape of the characteristic curve depends on the vehicle type and the demands on the system. In the following examples, however, it is always assumed that the characteristic curve, that is, the absolute value of the critical lateral acceleration as a function of the vehicle lateral velocity, increases monotonically for decreasing values of $v_y$.

In addition to $a_y$, the suitably filtered rate of rotation about the vehicle's longitudinal axis $\omega_x$ is also suitable for the threshold value decision, which is here used as conjunction. To be sure, the use of $\omega_x$ is less intuitive, since it is a lateral deceleration that initiates the soil trip event. Analyses of respective vehicle tests have shown, however, that, with suitable filtering, $\omega_x$ as well as $a_y$ are suitable as variables for a triggering threshold.

If one initially starts from a continuous, approximately exact determination of the vehicle lateral velocity $v_y$, then, following the fulfillment of a start condition for the algorithm, the sensed values for $a_y$, $\omega_x$ and $v_y$ are compared continuously, that is, in every loop of the algorithm, to the critical values stored in the form of a characteristic curve. If at a time t, the value pair $(a_y, v_y)$ lies above the critical value of the characteristic curve, then the main triggering condition is fulfilled. Additionally, it must be ensured that the lateral acceleration actually does induce a rotation. This will be discussed farther below. In addition to $a_y$, $\omega_x$ can also be compared to a threshold value set as a function of $v_y$, or the threshold value that is a function of $v_y$ can be modified as a function of $\omega_x$.

In the following it is always assumed that $a_y$ is negative, that is, a deceleration, and that $v_y$ as well as the rate of rotation $\omega_x$ are positive. If one assumes that $a_y$ is determined by a sensor in the airbag control unit, then the sign will depend on whether the soil trip comes about by slipping laterally to the left or to the right. In the same way, the sign of $v_y$ depends on the convention used in ascertaining $v_y$. The following method lends itself to the implementation in the microcontroller, that is, in the processor in the airbag control unit:

The values are established for all variables $v_y$, $a_y$ and $\omega_x$. In addition, a sign check ensures that, as a condition for a rollover event, $v_y$, $a_y$ and $\omega_x$ all point in the same direction.

The lateral acceleration that causes the vehicle to tilt is essentially determined by the position of the center of gravity and the track width of a vehicle and is computationally captured by the static stability factor (SSF). For passenger cars and SUVs (sports utility vehicle), typical values lie in the range of approx. SSF=1.0 to 1.7. The SSF corresponds to the lateral acceleration in units of g that are necessary for rolling over the vehicle. As the lowest triggering threshold, the characteristic curve for $|a_y|$ with respect to $v_y$ will thus always have a value, which, for the respective vehicle, will lie above the SSF value in g. Depending on the ground below, however, it is also possible that a high acceleration builds up on all tires, that is, not only on the right or left tires when laterally slipping to the right or to the left, but no sufficiently high torque is induced for the vehicle to roll over. If for the triggering decision one relies exclusively on the exceedance of a threshold value for $|a_y|$ as a function of $v_y$, then in the most unfavorable case this can result in triggering when there is a strong vehicle lateral acceleration without a significant buildup of a tilting angle. To suppress triggering in such cases, it is advantageous to require an additional triggering condition to the rate-of-rotation signal. The following methods lend themselves as a possible implementation of the additional consideration of the rate-of-rotation signal:

a) as an additional triggering condition, a threshold of the suitably filtered rate of rotation must be exceeded;

b) as an additional triggering condition, a threshold of the integrated rate of rotation, that is, the built-up angle, must be exceeded, the start of the integration being advantageously tied to the exceedance of a threshold value of the rate of rotation;

c) furthermore, the start of an integration of a rate of rotation can be tied to the exceedance of a threshold value of the vehicle lateral acceleration. In this case, the rate of rotation will only be integrated when the suitably filtered vehicle lateral acceleration lies above a defined value. As an additional triggering condition, it is then necessary that the resulting integral, which has the dimension of an angle, exceeds a threshold value.

The tasks just described do not arise if one regards a triggering threshold for $\omega_x$ as a function of $v_y$. Even in driving maneuvers, however, that are not soil trip relevant, for example in tight and fast cornering, it is under certain circumstances also possible for very high rates of rotation to build up, which could then possibly result in false triggerings. In this case, it is thus advantageous additionally to introduce a threshold based on the sensory signal of the vehicle lateral acceleration. In analogy to the previously described additional triggering conditions on the basis of the rate-of-rotation signal, the following examples of an implementation will be described:

a) as an additional triggering condition, a threshold of the suitably filtered vehicle lateral acceleration must be exceeded;

b) as an additional triggering condition, a threshold of the integrated vehicle lateral acceleration, that is, the velocity reduction, must be exceeded, the start of the integration being advantageously tied to the exceedance of a threshold value of the vehicle lateral acceleration;

c) furthermore, the start of an integration of the vehicle lateral acceleration can be tied to the exceedance of a threshold value of the rate of rotation. In this case, the vehicle lateral acceleration will only be integrated when the suitably filtered rate of rotation lies above a defined value. As an additional triggering condition, it is then necessary that the resulting integral, which has the dimension of a velocity, exceeds a threshold value.

Thus, for generating a triggering decision, it is in any event advantageous to conjoin the signals of a rate-of-rotation sensor and of an acceleration sensor. So far methods have been described in which a main triggering decision is made on the basis of a characteristic curve for $a_y$ and $\omega_x$ and then an additional weaker triggering condition bases plausibilization on the behavior of $\omega_x$ or $a_y$. Of course, a balanced triggering decision of $a_y$ and $\omega_x$ is possible as well, i.e., that characteristic curves are defined for $a_y$ as well as for $\omega_y$, whose triggering decisions are suitably conjoined, for example by a simple logical AND. In addition, $a_y$ and $\omega_x$ may be suitably processed (e.g., filtered and integrated) and conjoined.

Figure 2:
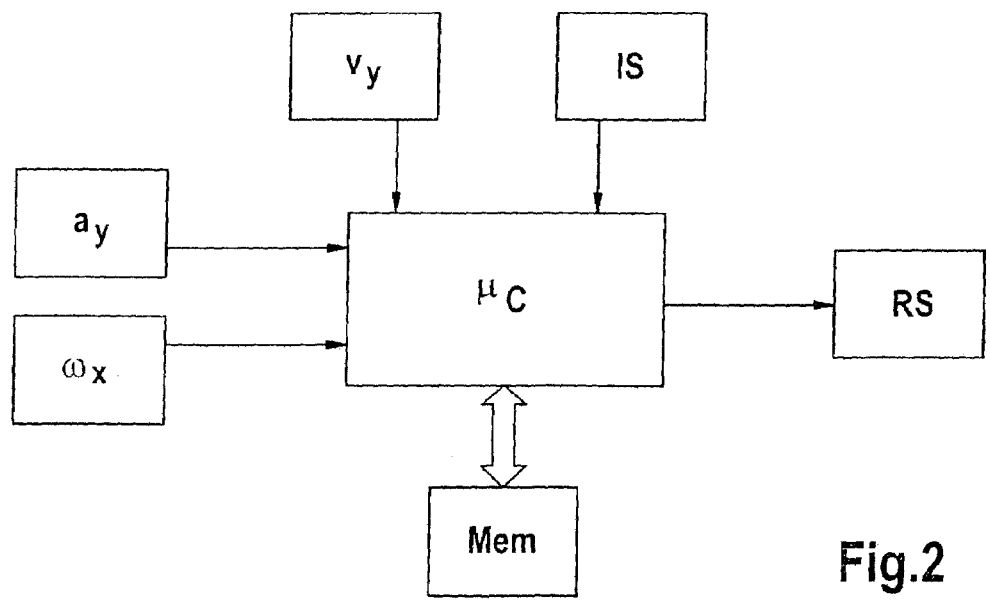
FIG. 2 shows a block diagram of a device according to the present invention.

FIG. 2 shows a block diagram of the device according to the present invention. A processor, a microcontroller or a microprocessor μC, which is located in a control unit for restraint means, is connected via a data input/output to a memory Mem, in which threshold values and families of characteristics are stored. Sensor data come from a sensor for vehicle lateral acceleration $a_y$ and a rate-of-rotation sensor $\omega_x$. Alternatively, it is possible to determine the rate of rotation with the aid of a number of acceleration sensors. The individual sensors normally feature their own electronics for amplifying and digitizing the measured values. The values for vehicle lateral velocity $v_y$ come from an additional sensor or are computed by an external unit, for example ESP, or raw data are provided by an external unit, from which the vehicle lateral velocity is estimated using an appropriate algorithm in processor μC. Processor μC is connected to restraint means RS, for example airbags, belt tensioners or occupant safety systems such as a rollover bar. Restraint means RS are triggered in the event of a corresponding decision of the algorithm running in processor μC, it being possible to use additionally a passenger-compartment sensing system IS to adapt the triggering behavior accordingly. This includes, for example, the suppression of triggering for the belt tensioner or the window bag of the front passenger seat when it is not occupied. Weight sensors or imaging sensors may be used as means for passenger-compartment sensing.

FIG. 3 shows a block diagram of an example circuit arrangement for implementing the method according to the present invention. In the main circuit on top, the value for vehicle lateral acceleration $a_y$ derived from the relevant sensor data as well as an estimated quantity for vehicle lateral velocity $v_y$ are compared to a characteristic curve KL. The resulting triggering decision can be held by a holding element HG1 in order to optimize the correlation with the plausibility circuit below. In the plausibility circuit, a plausibility decision is made from $a_y$ and the suitably preprocessed sensor signal for rate of rotation $\omega_x$ by a suitable calculation (e.g. filtering and integration) and conjunction VK. This can be held by a holding element HG2. The decisions output by holding elements HG1 and HG2 (Yes for a positive triggering or plausibility decision) are conjoined in the element & by a logical AND, and the resulting decision (triggering Yes/No) is transmitted to the associated restraint means.

FIG. 4 shows a block diagram of a further example circuit arrangement for implementing the method according to the present invention. In the main circuit at the bottom, the value for rate of rotation $\omega_x$ derived from the relevant sensor data as well as an estimated quantity for vehicle lateral velocity $v_y$ are compared to a characteristic curve KL. The resulting triggering decision can be held by a holding element HG2 in order to optimize the correlation with the plausibility circuit above. In the plausibility circuit, a plausibility decision is made from $\omega_x$ and the suitably preprocessed sensor signal for the vehicle lateral acceleration $a_y$ by a suitable calculation (e.g. filtering and integration) and conjunction VK. This can be held by a holding element HG1. The decisions output by holding elements HG1 and HG2 are conjoined in the element & by a logical AND, and the resulting decision (triggering Yes/No) is transmitted to the associated restraint means.

FIG. 5 shows a block diagram of another example circuit arrangement for implementing the method according to the present invention having two main circuits above and below. The main circuits correspond to the main circuits in FIGS. 3 and 4. Likewise, in analogy to FIGS. 3 and 4, a plausibility circuit may be used which makes a plausibility decision from $\omega_x$ and $a_y$ by suitable calculation (e.g. filtering and integration) and conjunction VK. The decisions output by holding elements HG1, HG2 and HG3 are conjoined in the element & by a logical AND, and the resulting decision is transmitted to the associated restraint means. In place of the two characteristic curves KL1 and KL2, it is also possible to specify a characteristic curve which then calculates a critical value of $a_y$ as a function of $v_y$ and $\omega_x$ or a critical value of $\omega_x$ as a function of $v_y$ and $a_y$.

Figure 6:
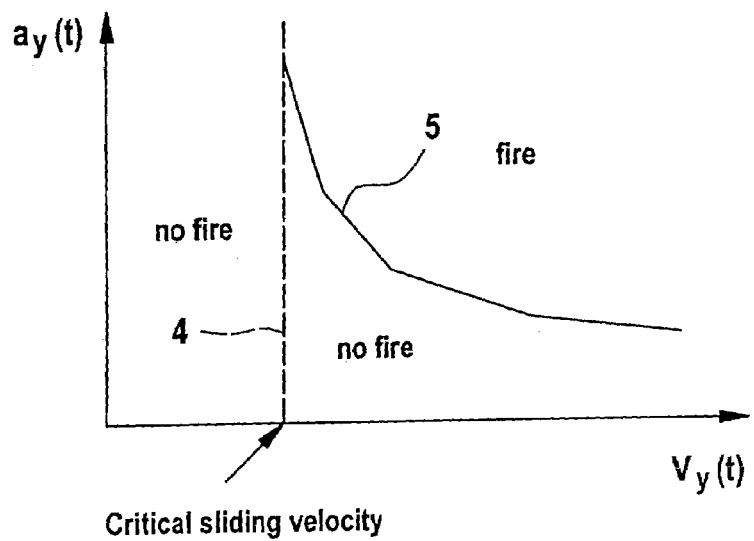
FIG. 6 shows an acceleration-velocity diagram for generating the triggering decision.

FIG. 6 shows a characteristic curve for the absolute value of the lateral acceleration $a_y$ as a function of the vehicle lateral velocity $v_y$, which is initially assumed to be known with sufficient precision and to be continuous. Below the so-called critical sliding velocity (CSV), triggering is generally prevented. If $v_y$ is greater than CSV, however, then the characteristic curve establishes the separation between triggering and non-triggering, it being assumed that $v_y$ is for all intents and purposes exactly known. The CSV is represented by line 4 running parallel to the ordinate, that is, to the vehicle lateral acceleration axis. Characteristic curve 5 represents the threshold for vehicle lateral acceleration $a_y$, which must be exceeded to bring about a triggering decision. A threshold for the rate of rotation about the longitudinal axis $\omega_x$ is generated in an equivalent manner.

Figure 7:
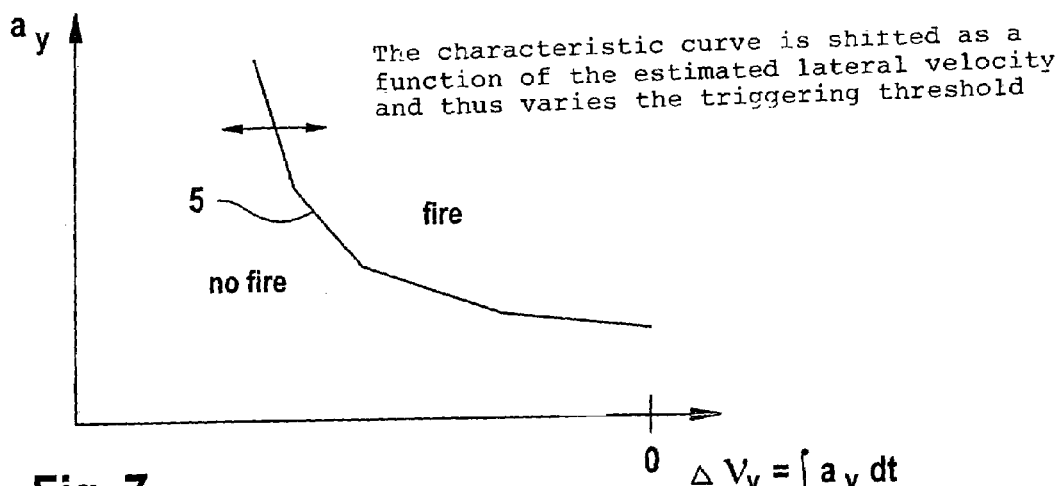
FIG. 7 shows a second acceleration-velocity diagram.

FIG. 7 shows the more general case of a lateral velocity that is ascertained only approximately and/or non-continuously. In an acceleration-velocity diagram, suitable characteristic curves for $a_y$ (or $\omega_x$ in an equivalent manner) are used as a function of the lateral velocity reduction $\Delta V_y$ and not $\Delta v_y$. $\Delta V_y$ is ascertained by integration from the integral of vehicle lateral acceleration $a_y$ measured in the vehicle. This is advantageous in order to compensate for the respective current deviation of the estimate value between two estimates in a non-continuous estimate of the lateral vehicle velocity. If necessary, the integration may be corrected by the effects of the gravitational acceleration in case of a tilting of the vehicle coordinate system vis-à-vis the earth-fixed coordinate system. In order to take the dependency of the triggering decision on the absolute vehicle lateral velocity $v_y$ into consideration, either multiple characteristic curves for various values of $v_y$ are stored and extrapolated between the characteristic curves, or a characteristic curve is shifted as a function of the estimate value of $v_y$. The horizontal double arrow in FIG. 7 indicates that this characteristic curve is shifted as a function of the lateral velocity.

Figure 8:
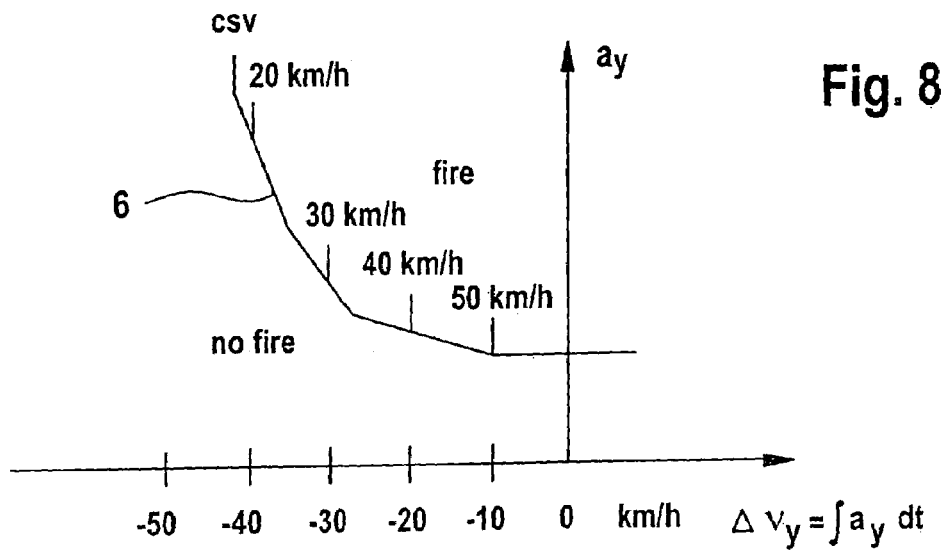
FIG. 8 shows a third acceleration-velocity diagram.

FIG. 8 shows a possibility for shifting the characteristic curve. The CSV is ascertained for a vehicle from theoretical calculations or from suitable tests. Below this vehicle lateral velocity, the algorithm blocks triggering. The nodes of the characteristic curve are pairs of values ($v_y$, $|a_i|$), the lowest value of $v_y$ normally being equal to the CSV. Velocity values are specified in FIG. 8 by way of example. Above a velocity $v_y$ MAX, the triggering threshold is constant. Here $v_y$ MAX equals 50 km/h. The characteristic curve is shifted in such a way that, at time to of the velocity estimate, the pair of values ($v_y$, $|a_y|$) of the characteristic curve agrees with the zero point of the $\Delta v_y$ axis. That is to say, the triggering threshold at time $t_0$ results from the pair of values ($v_y$, $|a_y|$). The shifting of the characteristic curve can be realized in a microcontroller in the most simple way via the addition of an offset to $\Delta v_y$. For illustrative purposes, however, the following will speak of shifting the characteristic curve. FIG. 8 shows the projection of an exactly determined velocity. In this case, the triggering behavior passes over into the case of a characteristic curve $|a_y|$ with respect to $v_y$ shown in FIG. 6. In general, however, $a_y$ is determined at a higher rate than $v_y$, which means that there is no continuous measurement of $v_y$, and that the characteristic curve remains constant for the time between two estimates of $v_y$, while $\Delta v_y$ is calculated continuously, and the measured value for $a_y$ is compared to the assigned threshold value. Time to of the estimate of $v_y$ determines the start of the integration. As soon as a new value of $v_y$ is available, the characteristic curve will be shifted accordingly and $\Delta v_y$ is set back to zero. That is to say, to is established anew.

Figure 9:
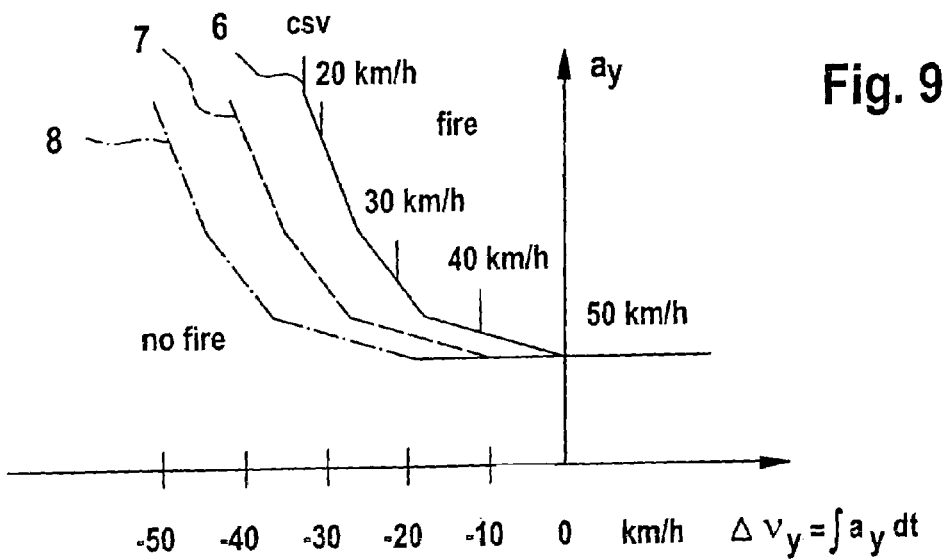
FIG. 9 shows a fourth acceleration-velocity diagram.

FIG. 9 shows a further possibility for shifting the characteristic curve, namely, when the vehicle lateral velocity is not known exactly. In this example, the vehicle lateral velocity is ascertained with a precision of ±10 km/h. The strategy here is one of a conservative triggering, i.e., in case of an imprecise velocity estimate, the triggering may only be delayed, while a false triggering or a premature triggering must not occur. Thus, if the estimated velocity is 60 km/h, for example, with a precision of ±10 km/h, then the true velocity will lie between 50 and 70 km/h. The most conservative setting is the one for 50 km/h, and the characteristic curve for 50 km/h is accordingly shifted to $\Delta v_y=0$. The characteristic curves for an exact velocity of 60 km/h (dashed) and 70 km/h (dotted) are likewise shown in FIG. 9. It becomes clear that the setting for 50 km/h is the most conservative one, i.e., for equal values of $\Delta v_y$, a triggering will occur at higher values of $|a_y|$.

Of the additional possibilities for varying the characteristic curve, three more will be specified here:

a) If in addition to the vehicle lateral velocity also its precision is estimated, for example in the form of an upper and lower error interval, then the above-described method can be modified in such a way that in a new estimate the estimated lateral velocity is reduced by the respective current precision, that is, not by a fixed value, and the characteristic curve is shifted by the reducing value. This has the consequence that that the vehicle lateral velocity cannot be overestimated and thus that an exact determination of the vehicle lateral velocity cannot result in a premature or unintended triggering.

b) Instead of subtracting a quantity, the estimated value of $v_y(t)$ can also be scaled, e.g. $v_y^*(t)=CSV+x(v_y(t)-CSV)$ where $0<x\leq1$; $v_y^*$ is then the velocity value of the characteristic curve which is shifted to $\Delta v_y=0$. For the limit value x=0, triggering is suppressed completely. For the case of x=1, $v_y^*=v_y$, i.e., we again pass over into the case of an exact determination of $v_y$.

c) A further possibility is the combination of the cases a) and b).

What is claimed is:

1. A method for generating a triggering decision for a restraint mechanism in a vehicle, comprising:

ascertaining at least a velocity of the vehicle's center of gravity, a vehicle lateral acceleration, and a rate of rotation about the longitudinal axis of the vehicle;

comparing the vehicle lateral acceleration to a first threshold value, wherein the first threshold value is set at least as a function of at least one component of the velocity of the vehicle's center of gravity, wherein the comparing results in a first triggering decision;

conjoining at least the vehicle lateral acceleration and the rate of rotation about the longitudinal axis of the vehicle, wherein the conjoining results in at least a second triggering decision; and generating the triggering decision for the restraint mechanism in the vehicle, wherein the generating takes into account at least the first and second triggering decisions.

2. The method as recited in claim 1, wherein the conjoining is performed in such a way that at least one of the vehicle lateral acceleration and the rate of rotation about the longitudinal axis of the vehicle is compared to at least one pair of values, the at least one pair of values being formed as a function of the at least one component of the velocity of the vehicle's center of gravity.

3. The method as recited in claim 2, wherein at least one set of pairs of values for the at least one component of the velocity of the vehicle's center of gravity is stored, and wherein a new set of pairs of values is obtained by extrapolation from the at least one set that is stored.

4. The method as recited in claim 1, further comprising:
comparing the at least one component of the velocity of the vehicle's center of gravity to a second threshold value that is a function of a type of the vehicle, wherein triggering of the restraint mechanism is prevented if the second threshold value is not reached.

5. The method as recited in claim 3, wherein determination of the at least one set of pairs of values is influenced as a function of a precision of the velocity estimate for the at least one component of the velocity of the vehicle's center of gravity.

6. The method as recited in claim 1, further comprising: comparing the rate of rotation to a third, fixed threshold value.

7. The method as recited in claim 1, further comprising:
comparing the rate of rotation to a third threshold value, the third threshold value being set as a function of the at least one component of the velocity of the vehicle's center of gravity.

8. The method as recited in claim 1, wherein the first threshold value is varied as a function of the rate of rotation.

9. The method as recited in claim 1, further comprising:
comparing the at least one component of the velocity of the vehicle's center of gravity to a second threshold value that is a function of a type of the vehicle, wherein triggering of the restraint mechanism is prevented if the second threshold value is not reached;
wherein at least one set of pairs of values for the at least one component of the velocity of the vehicle's center of gravity is stored, and wherein a new set of pairs of values is obtained by extrapolation from the at least one set that is stored.

10. The method as recited in claim 9, wherein determination of the at least one set of pairs of values is influenced as a function of a precision of the velocity estimate for the at least one component of the velocity of the vehicle's center of gravity.

11. The method as recited in claim 10, further comprising: comparing the rate of rotation to a third, fixed threshold value.

12. The method as recited in claim 9, further comprising: comparing the rate of rotation to a third, fixed threshold value.

13. The method as recited in claim 10, further comprising:
comparing the rate of rotation to a third threshold value, the third threshold value being set as a function of the at least one component of the velocity of the vehicle's center of gravity.

14. The method as recited in claim 9, further comprising:
comparing the rate of rotation to a third threshold value, the third threshold value being set as a function of the at least one component of the velocity of the vehicle's center of gravity.

15. The method as recited in claim 10, wherein the first threshold value is varied as a function of the rate of rotation.

16. The method as recited in claim 9, wherein the first threshold value is varied as a function of the rate of rotation.

17. The method as recited in claim 10, further comprising:
comparing the rate of rotation to a third, fixed threshold value;
wherein the first threshold value is varied as a function of the rate of rotation.

18. The method as recited in claim 9, further comprising:
comparing the rate of rotation to a third, fixed threshold value;
wherein the first threshold value is varied as a function of the rate of rotation.

19. The method as recited in claim 10, further comprising:
comparing the rate of rotation to a third threshold value, the third threshold value being set as a function of the at least one component of the velocity of the vehicle's center of gravity;
wherein the first threshold value is varied as a function of the rate of rotation.

20. The method as recited in claim 9, further comprising:
comparing the rate of rotation to a third threshold value, the third threshold value being set as a function of the at least one component of the velocity of the vehicle's center of gravity;
wherein the first threshold value is varied as a function of the rate of rotation.

* * * * *